(12) United States Patent
Hohensee et al.

(10) Patent No.: US 10,747,479 B2
(45) Date of Patent: Aug. 18, 2020

(54) METADATA INDEXING FOR ADVANCED FUNCTION PRESENTATION SYSTEMS

(71) Applicants: Reinhard Hohensee, Boulder, CO (US); Harry Lewis, Longmont, CO (US); Michael Lotz, Longmont, CO (US)

(72) Inventors: Reinhard Hohensee, Boulder, CO (US); Harry Lewis, Longmont, CO (US); Michael Lotz, Longmont, CO (US)

(73) Assignee: RICOH COMPANY, LTD., Tokyo (JP)

( * ) Notice: Subject to any disclaimer, the term of this patent is extended or adjusted under 35 U.S.C. 154(b) by 1356 days.

(21) Appl. No.: 14/174,512

(22) Filed: Feb. 6, 2014

(65) Prior Publication Data

US 2015/0220285 A1 Aug. 6, 2015

(51) Int. Cl.
*G06F 3/12* (2006.01)
(52) U.S. Cl.
CPC .......... *G06F 3/1206* (2013.01); *G06F 3/1244* (2013.01)
(58) Field of Classification Search
CPC .... G06F 17/211; G06F 3/1211; G06F 3/1285; G06F 17/2258; G06F 17/30; G06F 17/30722; G06F 3/1205; G06F 3/1247; G06F 3/126; G06F 3/1298
USPC .................................................. 358/1.1, 1.15
See application file for complete search history.

(56) References Cited

U.S. PATENT DOCUMENTS

| | | | |
|---|---|---|---|
| 5,813,020 A | 9/1998 | Hohensee | |
| 8,108,380 B2 | 1/2012 | Fothergill | |
| 8,397,162 B2* | 3/2013 | Eiler | G06F 17/211 |
| | | | 358/1.15 |
| 8,484,221 B2 | 7/2013 | Maddali | |
| 2008/0143169 A1 | 6/2008 | Mastie | |
| 2010/0241952 A1 | 9/2010 | Condon | |
| 2012/0246559 A1* | 9/2012 | DeRoller | G06F 3/1211 |
| | | | 715/239 |

OTHER PUBLICATIONS

Mixed Object Document Content Architecture (MO:DCA) reference Ninth edition (Jul. 2011).*
"IBM. Programming guide and line data reference" © International Business Machines Corporation 1994, 2006. IBM Printing Systems, Boulder, CO 80301-9191.
PDF in a high volume transactional printing environment. Crawford Technologies Inc., Toronto, ON, Canada M4V 1K9.
AFP extensions, (2013). Available at: http://www.ecrion.com/help/products/xfrenderingserver/xfultrascalehelp3/afpextensions.htm.
Mixed Object Document Content Architecture (MO:DCA) Reference, AFPC-0004-08, Copyright AFP Consortium 1990, 2011.

* cited by examiner

*Primary Examiner* — Iriana Cruz
(74) *Attorney, Agent, or Firm* — Duft & Bornsen, PC

(57) ABSTRACT

Systems and methods are provided for indexing in Advanced Function Presentation (AFP) systems. One embodiment is a system that includes a memory and a controller. The controller is able to load Advanced Function Presentation (AFP) print data, to identify AFP objects within the print data, to correlate the AFP objects with contextual information describing the AFP objects, and to insert the contextual information for the AFP objects into AFP Object Container Data (OCD) structures within AFP Index Elements (IELs) of an AFP index. The memory is able to store the index.

19 Claims, 8 Drawing Sheets

FIG. 5

AFP PRINT DATA

```
<BEGIN DOCUMENT>
    <BEGIN PAGE>
    ...
    <END PAGE>
    <BEGIN PAGE>
    ...
    <END PAGE>
    <BEGIN PAGE>
        SIZE=LETTER
        ORIENTATION=PORTRAIT
        <BEGIN IMAGE OBJECT>
            NAME=PIE CHART
            COMPRESSION=JPEG
            IMAGE DATA
        <END IMAGE OBJECT>
        <BEGIN TEXT OBJECT>
            NAME=EXECUTIVE SUMMARY
            TEXT DATA
        <END TEXT OBJECT>
        <BEGIN TEXT OBJECT>
            NAME=DETAILED REPORT
            TEXT DATA
        <END TEXT OBJECT>
        <BEGIN TEXT OBJECT>
            NAME=TITLE
            TEXT DATA
        <END TEXT OBJECT>
    <END PAGE>
<END DOCUMENT>
...
```

INDEX

```
<BEGIN DOCUMENT INDEX>
    <INDEX ELEMENT>
        BYTE OFFSET
        <BEGIN OBJECT CONTAINER>
        <OBJECT CONTAINER DATA
            NAME=PIE CHART
            READ ORDER=3
            ENGLISH ALT TEXT = "PROFITS
            BY PERCENTAGE.  SERVICES: 50%
            PRODUCTS: 30% INVESTMENTS:
            20%."
            GERMAN ALT TEXT = "GEWINN
            PROZENTUAL. DIENSTLEISTUNGEN:
            50% PRODUKTE: 30% INVESTITIONEN:
            20%."
            SPANISH ALT TEXT =
            "GANANCIAS POR CIENTO. SERVICIOS:
            50% LOS PRODUCTOS: 30%
            INVERSIONES: 20%.">
        <END OBJECT CONTAINER>
    <INDEX ELEMENT>
        BYTE OFFSET
        <BEGIN OBJECT CONTAINER>
        <OBJECT CONTAINER DATA
            NAME=TITLE
            READ ORDER=1
            ENGLISH ALT TEXT = ...
            GERMAN ALT TEXT = ...
            SPANISH ALT TEXT = ...>
        <END OBJECT CONTAINER>
    ...
<END DOCUMENT INDEX>
```

METADATA INDEXING FOR ADVANCED FUNCTION PRESENTATION SYSTEMS

FIELD OF THE INVENTION

The invention relates to the field of printing, and in particular, to stored print data.

BACKGROUND

Advanced Function Presentation (AFP) is a format used to store print data for print jobs. According to AFP standards, a print job is divided into AFP objects. Each AFP object may define a part of the print job, such as a document, a page, an image, text, etc. Furthermore, AFP objects may be nested within each other. For example, an AFP document object may include multiple AFP page objects, and each AFP page object may include multiple text and/or graphical objects.

Each AFP print job may be associated with metadata. Metadata is contextual information used to describe the print job. For example, metadata may indicate an author of the print job, may indicate a preferred rasterization algorithm to use while processing the print job, or may indicate any other suitable characteristic of the print job. As presently required according to AFP standards, metadata for an AFP print job is stored within an index as a series of one or more AFP-defined Index Elements (IELs). Each IEL includes Tagged Logical Elements (TLEs) that each contain a single name-value attribute pair.

Name-value pairs may not be an optimal format for each and every form of metadata which a user may wish to add to a print job. Therefore, users continue to desire enhanced flexibility in defining contextual information for a print job.

SUMMARY

Embodiments described herein utilize AFP Object Container Data (OCD) structures to store metadata for IELs in AFP indices. OCDs allow for information to be stored in any desirable format. Thus, IELs described herein may use OCDs to include tiered/nested contextual information, on an object-by-object basis, for each print job. These enhancements may be beneficial in a variety of scenarios, such as in situations where there are multiple versions of text (e.g., one version per language) that may be used to describe an AFP object.

One embodiment is a system that includes a memory and a controller. The controller is able to load Advanced Function Presentation (AFP) print data, to identify AFP objects within the print data, to correlate the AFP objects with contextual information describing the AFP objects, and insert the contextual information for the AFP objects into AFP Object Container Data (OCD) structures within AFP Index Elements (IELs) of an AFP index. The memory is able to store the index.

Another embodiment is a system that includes a memory and a controller. The controller is able to load Advanced Function Presentation (AFP) print data into the memory, to access an AFP index for the AFP print data, to extract contextual information describing AFP objects from within AFP Object Container Data (OCD) structures within AFP Index Elements (IEL) of the index, and to provide the contextual information via at least one of a display, an audio device, or a multimedia device.

Another embodiment is a non-transitory computer readable medium embodying programmed instructions which, when executed by a processor, are operable for performing a method. The method includes loading Advanced Function Presentation (AFP) print data, identifying AFP objects within the print data, correlating the AFP objects with contextual information describing the AFP objects, and inserting the contextual information for the AFP objects into AFP Object Container Data (OCD) structures within AFP Index Elements (IELs) of an AFP index. The method also includes storing the index in the memory.

Another embodiment is a method. The method includes loading Advanced Function Presentation (AFP) print data, identifying AFP objects within the print data, correlating the AFP objects with contextual information describing the AFP objects, and inserting the contextual information for the AFP objects into AFP Object Container Data (OCD) structures within AFP Index Elements (IELs) of an AFP index. The method also includes storing the index in the memory.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

FIG. 5 is a diagram illustrating AFP print data and contextual information stored in an index in an exemplary embodiment.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
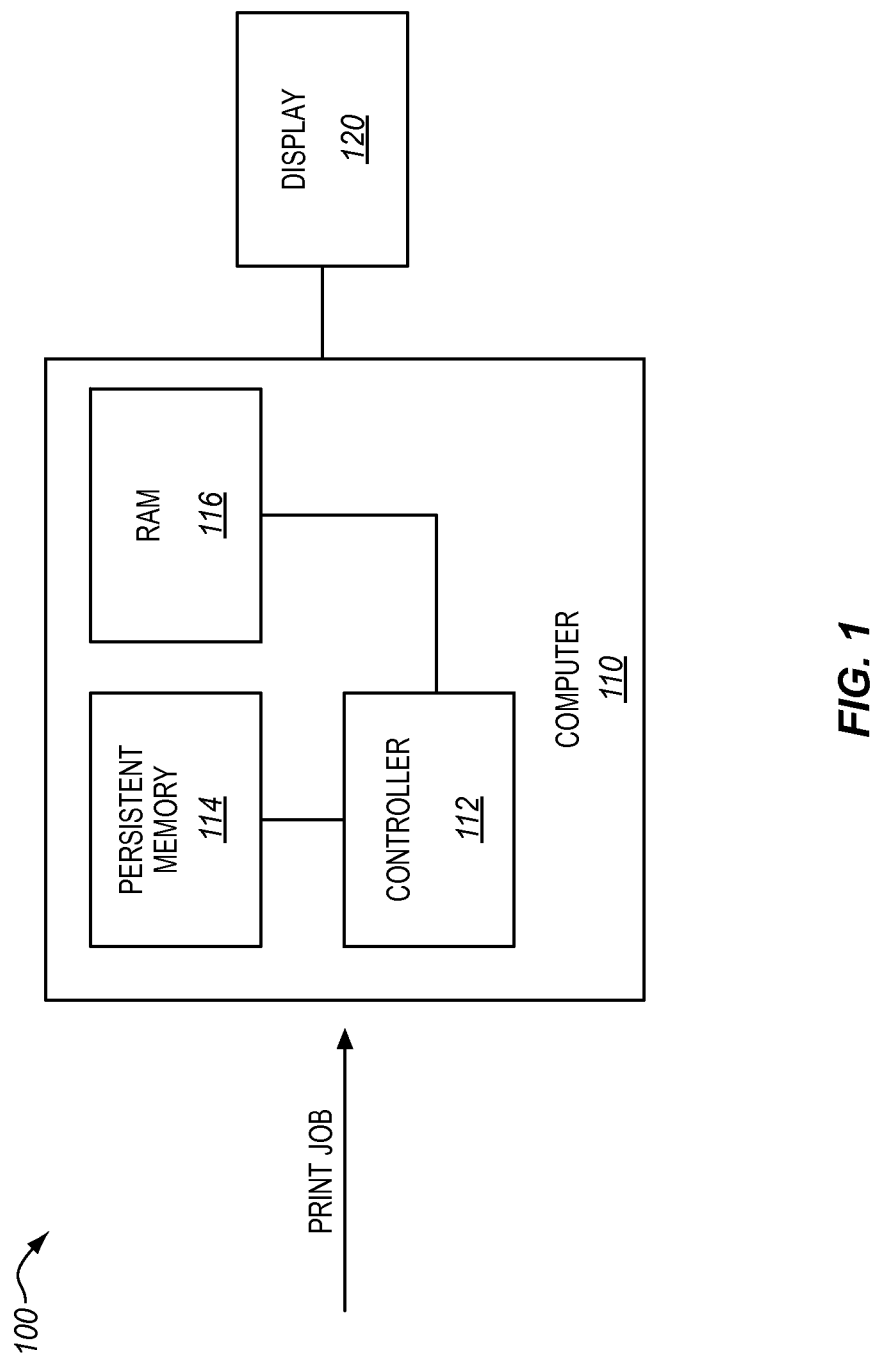
FIG. 1 is a block diagram of an AFP indexing system in an exemplary embodiment.

FIG. 1 is a block diagram of an AFP indexing system 100 in an exemplary embodiment. AFP indexing system 100 may be used by a print shop operator to generate and/or process indices for AFP print jobs. A print shop operator may generate an index for a print job in order to store metadata for the print job. For example, consider a print job that will be delivered to people who speak different languages. In such cases, the print job may be printed and physically delivered in one language, while the metadata may be sent with an electronic version of the job in order to describe objects within the print job in another language. AFP indexing system 100 comprises any system, device, or component operable to generate and/or process indices for AFP print data, such as a computer, a server, a network, etc.

AFP indexing system 100 has been enhanced to create and/or read AFP Index Elements (IELs) that include Object Container Data (OCD) structures inside of them. Using an AFP-defined OCD structure instead of a TLE, which would normally be required under the AFP Mixed Object Document Context Architecture (MO:DCA) standards, allows for greater flexibility in defining and processing the contextual information stored in the index. As used herein, the terms "contextual information" or "metadata" refer to information that describes an AFP object. This information may be classified as descriptive or operational in nature. Operational metadata is imperative, because it recites a series of commands that must be followed by a printing system when processing associated print data, even though the metadata itself does not appear on the final printed page. Descriptive metadata is different than operational metadata because, while descriptive metadata may provide contextual information (such as processing "hints" that suggest how to rasterize an image), descriptive metadata does not require that print data be processed in a specific way.

In this embodiment, AFP indexing system 100 comprises controller 112, persistent memory 114, and Random Access Memory (RAM) 116. Controller 112 manages the operations of computer 110, and may be implemented, for example, as custom circuitry or as a processor executing programmed instructions. Controller 112 may use persistent memory 114 (e.g., a disk drive) to store print data and/or indices for later retrieval. Controller 112 may use RAM 116 in order to actively load and process portions of AFP print data kept in persistent memory 114. Furthermore, controller 112 may utilize display 120 (e.g., a monitor, screen, etc.) in order to visually show indices or portions of print data to a user. Additional devices, such as audio devices or multimedia devices (e.g., televisions, etc.) may be used to provide information as desired.

The particular arrangement, number, and configuration of components described herein is exemplary and non-limiting. Illustrative details of the operation of AFP indexing system 100 will be discussed with regard to FIG. 2. Assume, for this embodiment, that AFP indexing system 100 has identified an AFP print job that has yet to be indexed.

Figure 2:
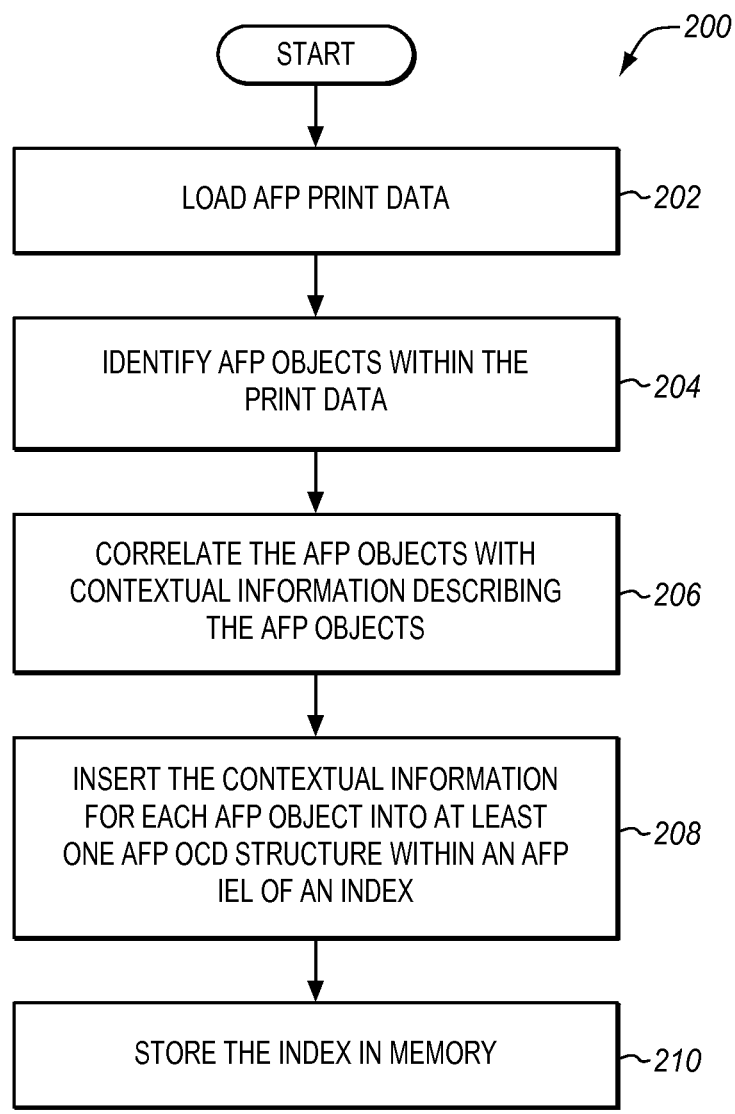
FIG. 2 is a flowchart illustrating a method for generating an AFP index in an exemplary embodiment.

FIG. 2 is a flowchart illustrating a method 200 for generating an AFP index in an exemplary embodiment. The steps of method 200 are described with reference to AFP indexing system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, controller 112 loads AFP print data from persistent memory 114 into RAM 116. In step 204, controller 112 identifies AFP objects within the print data. AFP objects may be identified, for example, based on the presence of AFP BEGIN structured fields within the print data.

In step 206, controller 112 correlates the identified AFP objects with contextual information that describes the AFP objects. This contextual information, or "metadata" may be descriptive or operational. For example, the contextual information may describe an algorithm used to compress an image, may include alternative text that describes an image, may include an alternate language version of text stored in an AFP object, etc. In some embodiments, contextual information may be stored in one language, and then translated by controller 112 before it is presented to the user. For example, contextual information that was originally written in French may be translated to English before it is presented.

The contextual information may be received from a user, retrieved from a database, or otherwise acquired by controller 112. Each piece of contextual information may be correlated with an AFP object based on a name that matches the AFP object, a byte offset indicating a location of the AFP object within the print data, a page location that matches the AFP object, a type that matches the AFP object, etc.

In step 208, controller 112 inserts the contextual information for each AFP object into at least one Object Container Data (OCD) structure within an AFP Index Element (IEL) of an AFP index for the print data. As described herein, an OCD may be considered to be within an IEL if the OCD immediately follows the IEL (and is therefore at the same location a TLE would otherwise be expected to occupy, meaning that the OCD is associated with the IEL). An OCD may also be considered to be within an IEL if the IEL is defined using BEGIN and END structured fields, and the OCD is placed between the BEGIN and END structured fields for the IEL.

Because the contextual information is kept within an OCD and is not kept within a TLE, the contextual information may be stored in any suitable format and is not limited to name-value pairs. For example, the contextual information may be stored in an Extensible Markup Language (XML) format, such as the Extensible Metadata Platform (XMP) standard. Furthermore, since the contextual information is not limited to name-value pairs, the contextual information may be stored as a multi-level hierarchy. For example, the contextual information within an OCD may include metadata for an AFP document object, and the metadata for the document object may include metadata for an AFP text object nested within the document object.

In step 210 controller 112 stores the index in persistent memory 114. The index may be maintained within the AFP print data itself, or may be stored as an entirely separate file.

Figure 3:
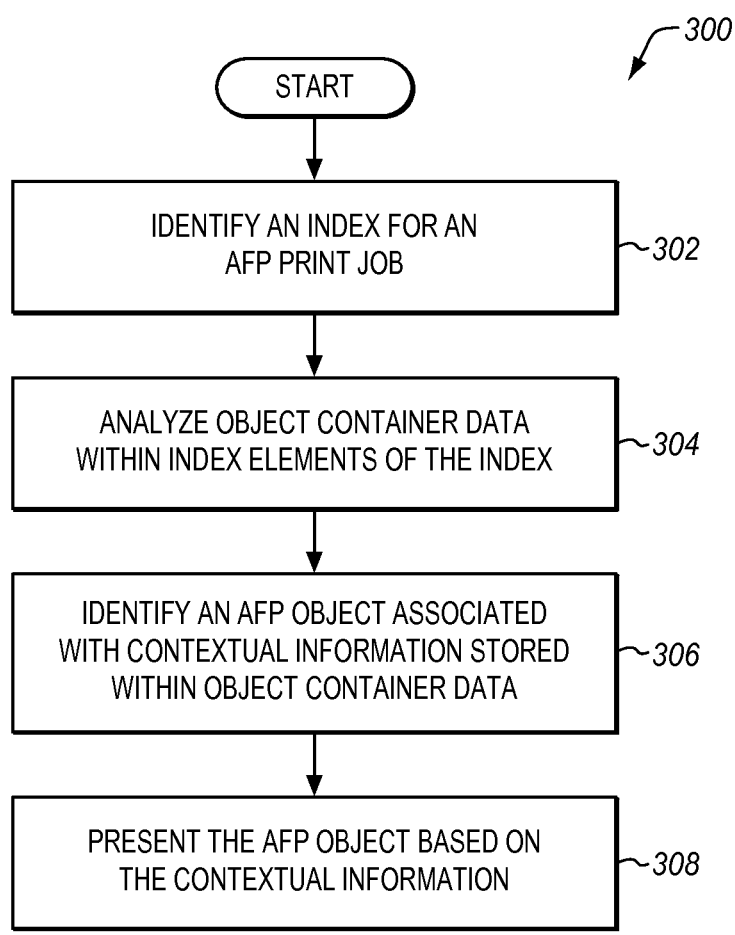
FIG. 3 is a flowchart illustrating a method for accessing an AFP index in an exemplary embodiment.

FIG. 3 is a flowchart illustrating a method 300 for accessing an AFP index in an exemplary embodiment. According to FIG. 3, in step 302, controller 112 identifies an index for an AFP print job. The index may be identified as a portion of an AFP print job or a separate file associated with the print job.

In step 304, controller 112 analyzes Object Container Data (OCD) kept within an Index Element (IEL) of the index, and in step 306 controller 112 identifies an AFP object associated with contextual information stored within an OCD. The AFP object within the print job may be identified, for example, based upon a byte offset provided within the IEL, based upon a name for the AFP object indicated in the OCD, etc.

In step 308, controller 112 presents the AFP object, based on the contextual information. For example, if the contextual information provides rendering hints for the AFP object, controller 112 may process the AFP object based on the rendering hints before presenting it. In another example, the contextual information may include alternative text for an AFP object, which may be presented alongside or in place of the AFP object when the AFP object is printed or displayed on a monitor/screen. In yet another example, the contextual information may indicate a display order for AFP objects.

Using methods 200 and 300 described above, indices for AFP print jobs may be generated and used in a manner that allows contextual information to be stored with greater flexibility. This in turn provides a benefit by improving the variety of situations in which AFP print jobs may be used.

Examples

In the following example, additional processes, systems, and methods are described in the context of an indexing system for AFP print jobs. Assume, for this example, that an index is being used to store contextual information for an AFP print job representing a quarterly report. The AFP index is stored as a separate file from the file that stores the print job.

Figure 4:
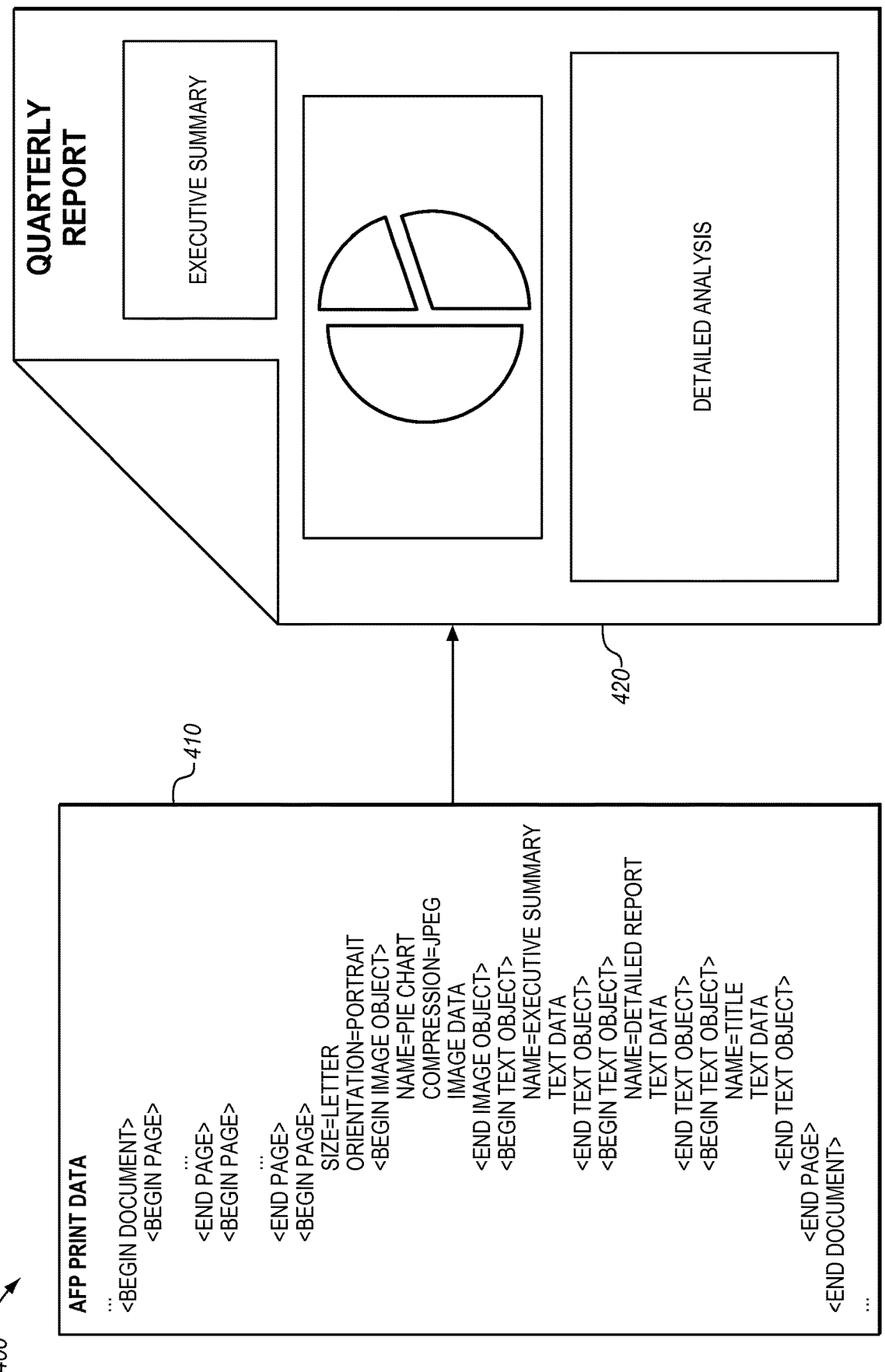
FIG. 4 is a diagram illustrating AFP print data and a rendered page in an exemplary embodiment.

FIG. 4 is a diagram 400 illustrating AFP print data 410 and a rendered page 420 in an exemplary embodiment. AFP print data 410 describes how and where to mark a page in order to generate physical output for the quarterly report, and page 420 represents a rendered version of the quarterly report as it would be printed. In short, FIG. 4 shows a page existing in a raw, unprocessed initial state on the left, while showing a rendered version on the right.

FIG. 5 is a diagram 500 illustrating AFP print data 410 and contextual information stored in an index 510 in an exemplary embodiment. Index 510 is used to store contextual data indicating a reading order for the AFP objects stored in the print job, as well as an alternative text for each AFP object stored in the print job. Using the reading order and alternative text within index 510, an indexing system may provide a spoken word version of the print job in a manner that flows logically and is also informative.

Figure 6:
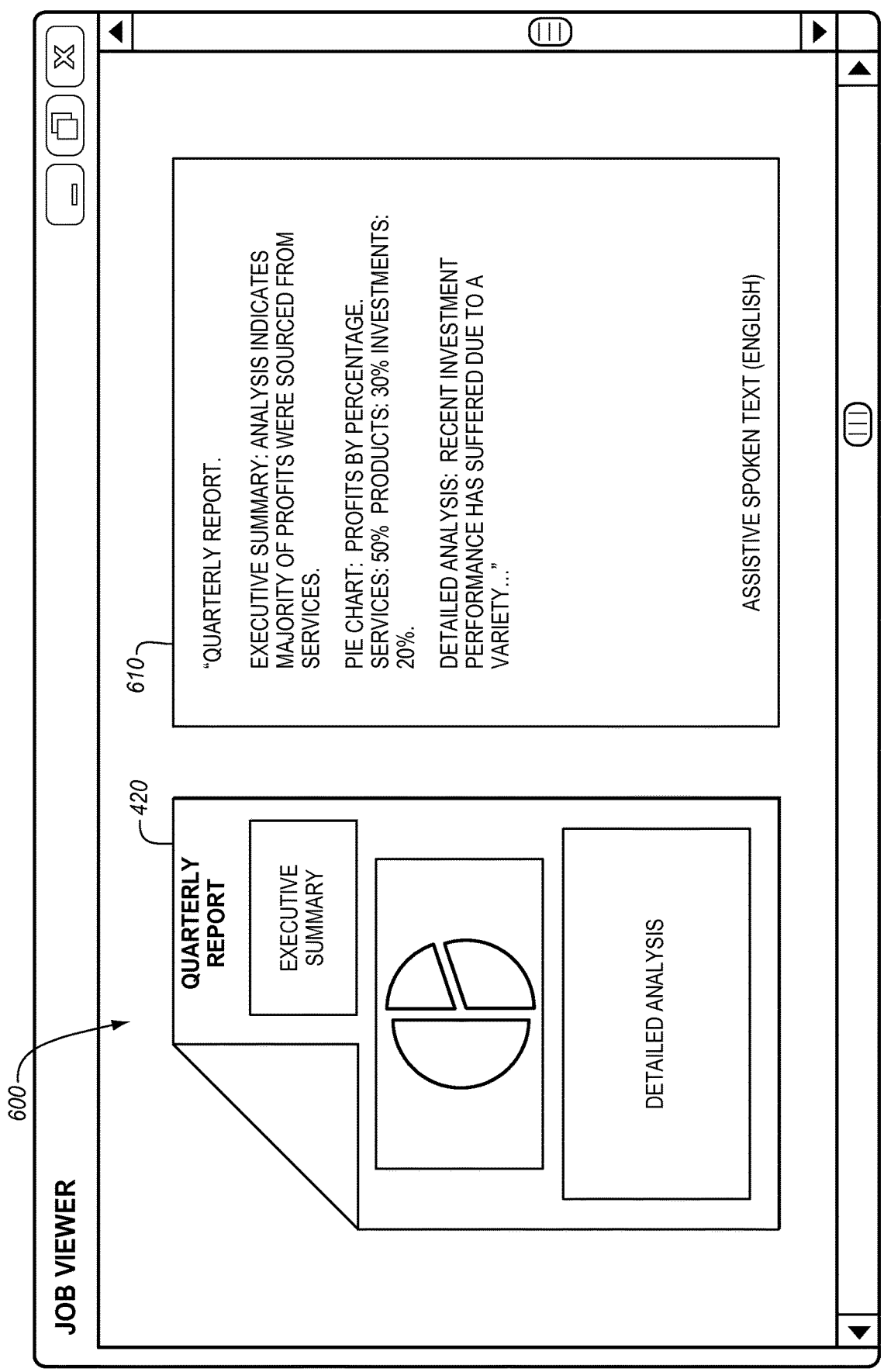
FIG. 6 is a diagram illustrating rendered AFP print data and contextual information stored in an index in an exemplary embodiment.

FIG. 6 is a diagram illustrating rendered AFP print data and contextual information stored in an index in an exemplary embodiment. In FIG. 6, graphical window 600 is used to present rendered page 420, as well as to provide a visual readout of spoken text from the quarterly report. This text may be read, for example, using an automated voice algorithm, and may be output via speakers, headphones, etc. In this example, even though the AFP objects as defined in the AFP print data are out of order, the contextual "read order" information was used to determine a proper order in which to read a description of the objects.

Figure 7:
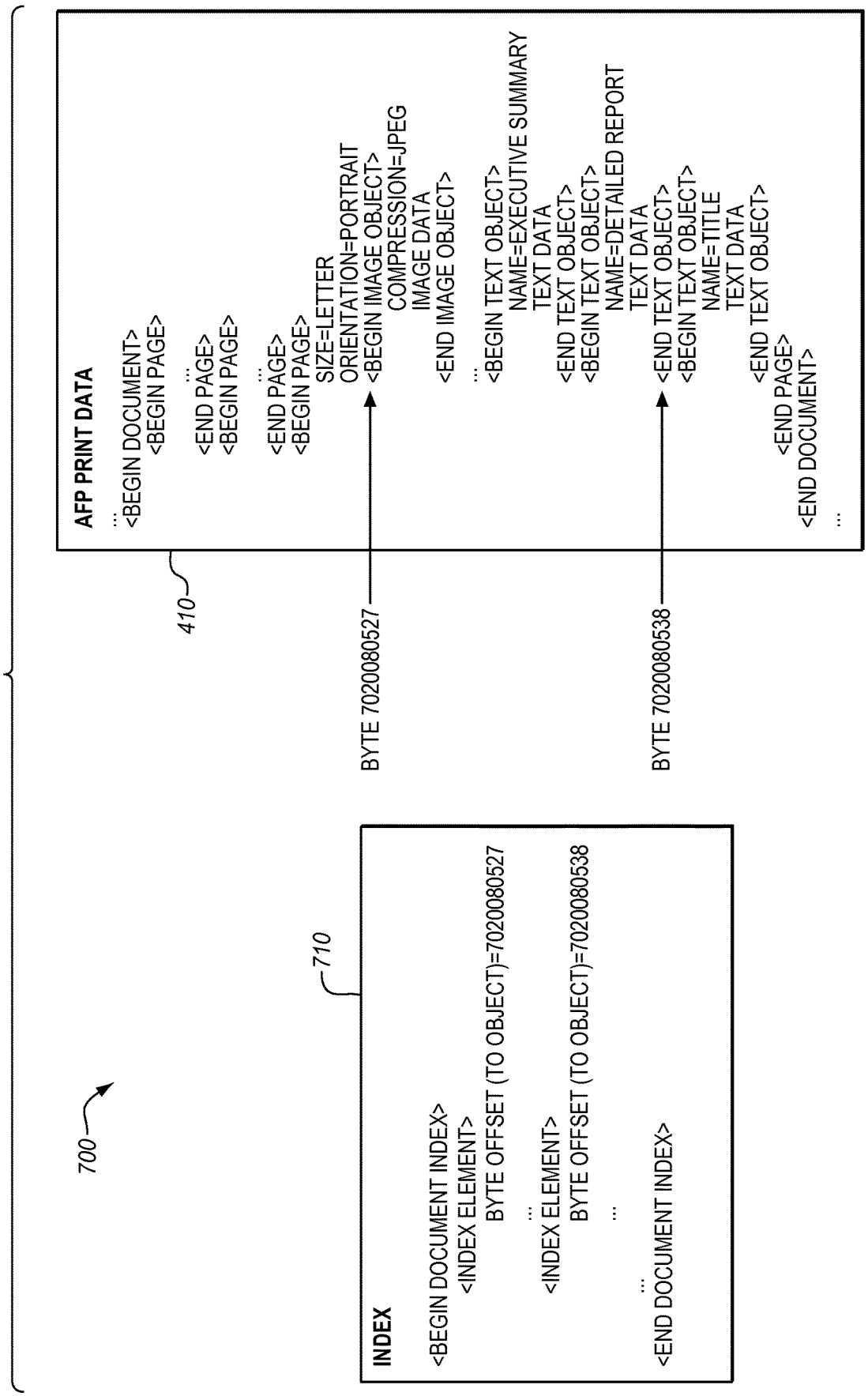
FIG. 7 is a diagram illustrating byte offsets used in an index for AFP print data in an exemplary embodiment.

FIG. 7 is a diagram 700 illustrating byte offsets used in an index 710 for AFP print data in an exemplary embodiment. The byte offsets for each IEL may indicate a number of bytes from the beginning of the AFP file that should be traversed in order to reach a given AFP object or given page that stores an AFP object. For example, the byte offset for each object referred to in the index may be provided within the IEL for that AFP object. Thus, on an object-by-object basis, the print data can be quickly and efficiently traversed.

Figure 8:
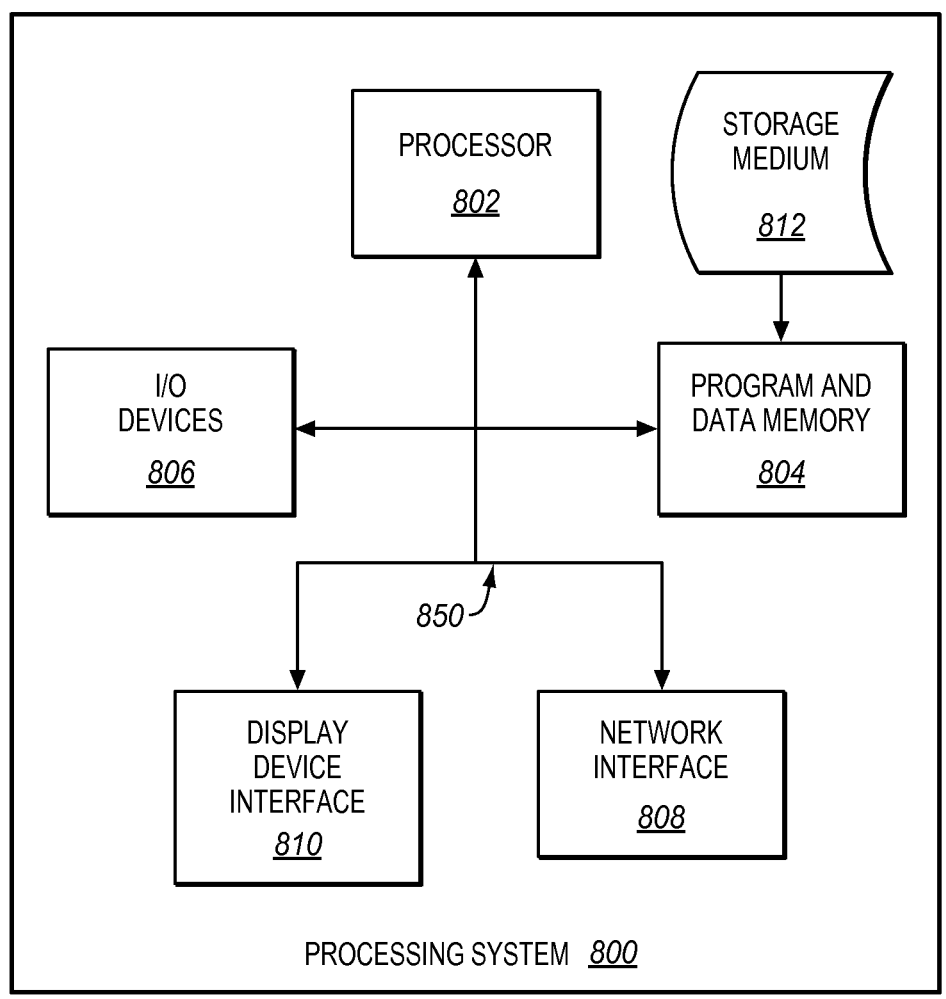
FIG. 8 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of AFP indexing system 100 to perform the various operations disclosed herein. FIG. 8 illustrates a processing system 800 operable to execute a computer readable medium embodying programmed instructions to perform desired functions in an exemplary embodiment. Processing system 800 is operable to perform the above operations by executing programmed instructions tangibly embodied on computer readable storage medium 812. In this regard, embodiments of the invention can take the form of a computer program accessible via computer-readable medium 812 providing program code for use by a computer or any other instruction execution system. For the purposes of this description, computer readable storage medium 812 can be anything that can contain or store the program for use by the computer.

Computer readable storage medium 812 can be an electronic, magnetic, optical, electromagnetic, infrared, or semiconductor device. Examples of computer readable storage medium 812 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 800, being suitable for storing and/or executing the program code, includes at least one processor 802 coupled to program and data memory 804 through a system bus 850. Program and data memory 804 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 806 (including but not limited to keyboards, displays, pointing devices, etc.) can be coupled either directly or through intervening I/O controllers. Network adapter interfaces 808 may also be integrated with the system to enable processing system 800 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 810 may be integrated with the system to interface to one or more display devices, such as printing systems and screens for presentation of data generated by processor 802.

Although specific embodiments were described herein, the scope of the invention is not limited to those specific embodiments. The scope of the invention is defined by the following claims and any equivalents thereof.

We claim:

1. A system comprising:
a controller operable to load Advanced Function Presentation (AFP) print data, to identify AFP objects within the print data, to correlate the AFP objects with contextual information describing the AFP objects, and to insert the contextual information for the AFP objects into AFP Object Container Data (OCD) structures within AFP Index Elements (IELs) of an AFP index; and
a memory operable to store the index,
wherein the contextual information for each AFP object is organized as a multi-level hierarchy of data, and the controller is further operable to insert contextual information for each AFP object into an OCD within the IEL, while preserving the organization of the contextual information.

2. The system of claim 1, wherein:
the controller is further operable to insert a byte offset indicator into each IEL, wherein each byte offset indicator for an IEL describes a number of bytes of the AFP print data to skip before reaching a page that stores an AFP object indicated by the IEL.

3. The system of claim 1, wherein:
the controller is further operable to insert a byte offset indicator into each IEL, wherein each byte offset indicator for an IEL describes a number of bytes of the AFP print data to skip before reaching an AFP object indicated in the IEL.

4. The system of claim 1, wherein:
the contextual information is selected from the group consisting of operational metadata and descriptive metadata.

5. The system of claim 1, wherein:
the contextual information comprises text describing contents of a graphical object in the AFP print data.

6. The system of claim 1, wherein:
each OCD includes contextual information in an Extensible Markup Language (XML) format.

7. The system of claim 6, wherein:
the contextual information comprises Extensible Metadata Platform (XMP) data.

8. A system comprising:
a memory; and
a controller operable to load Advanced Function Presentation (AFP) print data into the memory, to access an AFP index for the AFP print data, to extract contextual information describing AFP objects from within AFP Object Container Data (OCD) structures within AFP Index Elements (IEL) of the index, and to provide the contextual information via at least one of a display, an audio device, or a multimedia device,
wherein the contextual information for each AFP object is organized as a multi-level hierarchy of data, and the controller is further operable to insert contextual information for each AFP object into an OCD within the IEL, while preserving the organization of the contextual information.

9. The system of claim 8, wherein:
the controller is further operable to correlate the contextual information with the AFP objects by following a byte offset indicator within each IEL, wherein each byte offset indicator for an IEL describes a number of bytes of the AFP print data to skip before reaching a page that stores an AFP object indicated by the IEL.

10. The system of claim 8, wherein:
the controller is further operable to correlate the contextual information with the AFP objects by following a byte offset indicator within each IEL, wherein each byte offset indicator for an IEL describes a number of bytes of the AFP print data to skip before reaching an AFP object indicated in the IEL.

11. The system of claim 8, wherein:
the contextual information is selected from the group consisting of operational metadata and descriptive metadata.

12. The system of claim 8, wherein:
the contextual information comprises text describing contents of a graphical object in the AFP print data.

13. The system of claim 8, wherein:
each OCD includes contextual information in an Extensible Markup Language (XML) format.

14. The system of claim 13, wherein:
the contextual information comprises Extensible Metadata Platform (XMP) data.

15. A non-transitory computer readable medium embodying programmed instructions which, when executed by a processor, are operable for performing a method comprising:
loading Advanced Function Presentation (AFP) print data;
identifying AFP objects within the print data;
correlating the AFP objects with contextual information describing the AFP objects;
inserting the contextual information for the AFP objects into AFP Object Container Data (OCD) structures within AFP Index Elements (IELs) of an AFP index, wherein the contextual information for each AFP object is organized as a multi-level hierarchy of data, and the controller is further operable to insert contextual information for each AFP object into an OCD within the IEL, while preserving the organization of the contextual information; and
storing the index in a memory.

16. The medium of claim 15, wherein the method further comprises:
inserting a byte offset indicator into each IEL, wherein each byte offset indicator for an IEL describes a number of bytes of the AFP print data to skip before reaching a page that stores an AFP object indicated by the IEL.

17. The medium of claim 15, wherein the method further comprises:
inserting a byte offset indicator into each IEL, wherein each byte offset indicator for an IEL describes a number of bytes of the AFP print data to skip before reaching an AFP object indicated in the IEL.

18. The medium of claim 15, wherein:
each OCD includes contextual information in an Extensible Markup Language (XML) format.

19. The medium of claim 18, wherein:
the contextual information comprises Extensible Metadata Platform (XMP) data.

* * * * *